(12) United States Patent
Fink

(10) Patent No.: US 8,886,478 B2
(45) Date of Patent: Nov. 11, 2014

(54) EXTENDED BATTERY DIAGNOSIS IN TRACTION BATTERIES

(75) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 13/264,923

(22) PCT Filed: Feb. 25, 2010

(86) PCT No.: PCT/EP2010/052406
§ 371 (c)(1),
(2), (4) Date: Oct. 17, 2011

(87) PCT Pub. No.: WO2010/118912
PCT Pub. Date: Oct. 21, 2010

(65) Prior Publication Data
US 2012/0035872 A1 Feb. 9, 2012

(30) Foreign Application Priority Data
Apr. 17, 2009 (DE) .......................... 10 2009 002 466

(51) Int. Cl.
*H02J 7/00* (2006.01)
*B60L 11/18* (2006.01)
*H01M 10/48* (2006.01)
*H02J 7/14* (2006.01)

(52) U.S. Cl.
CPC ........... *H02J 7/1446* (2013.01); *B60L 11/1861* (2013.01); *Y02T 10/7005* (2013.01); *Y02T 10/705* (2013.01); *H01M 10/48* (2013.01); *B60L 2260/56* (2013.01); *H02J 2007/005* (2013.01); *B60L 2250/30* (2013.01); *Y02E 60/12* (2013.01); *Y02T 10/92* (2013.01); *Y02T 10/7044* (2013.01); *H02J 7/1438* (2013.01)
USPC ............................................ 702/63; 320/125

(58) Field of Classification Search
CPC ................................... B60K 6/445; H02J 7/00
USPC ........................................ 702/63; 180/65.265
See application file for complete search history.

(56) References Cited

U.S. PATENT DOCUMENTS

| | | | |
|---|---|---|---|
| 6,170,587 B1* | 1/2001 | Bullock | 180/69.6 |
| 8,660,725 B2* | 2/2014 | Kawai et al. | 701/22 |
| 2003/0052650 A1 | 3/2003 | Gunji | |
| 2006/0240291 A1 | 10/2006 | Kim et al. | |
| 2009/0277702 A1 | 11/2009 | Kanada et al. | |

FOREIGN PATENT DOCUMENTS

| | | |
|---|---|---|
| DE | 102006038675 A1 | 3/2008 |
| EP | 1932740 A1 | 6/2008 |
| JP | 6-242193 A | 9/1994 |
| JP | 2006-507790 A | 3/2006 |
| JP | 2008-58260 A | 3/2008 |
| JP | 2008-261669 A | 10/2008 |
| JP | 2009-42877 A | 2/2009 |
| JP | 2009-71986 A | 4/2009 |

* cited by examiner

*Primary Examiner* — Bryan Bui
(74) *Attorney, Agent, or Firm* — Maginot, Moore & Beck LLP

(57) ABSTRACT

The invention relates to a method and a device for determining the properties of a battery, in particular a traction battery. Particularly the invention determines a battery state such as the capacity and/or a charging state and/or a remaining service life of the battery, preferably with an observer and a battery model for a model-based state identification. According to the invention, a querying module for querying an operational state of a consumer supplied by a battery and a first control module for starting the determination of the properties of the battery, only when the operational state of the supplied consumer shows that it does not operate in the principal mode, are provided.

19 Claims, 5 Drawing Sheets

US 8,886,478 B2

EXTENDED BATTERY DIAGNOSIS IN TRACTION BATTERIES

CROSS-REFERENCE TO RELATED APPLICATION

This application is a 35 USC 371 application of PCT/EP 2010/052406 filed on Feb. 25, 2010.

BACKGROUND OF THE INVENTION

1. Field of the Invention

The present invention relates to a method and an apparatus for ascertaining the properties of the battery, in particular of a traction battery.

2. Description of the Prior Art

It is clear that in future, both in stationary applications (such as in wind farms) and in vehicles (such as hybrid and electric vehicles), new battery systems will increasingly come into use. The terms "battery" and "battery system" are used in the present specification, adapted to conventional linguistic usage, for "accumulator" and "accumulator system".

The basic functional layout of a battery system of the prior art is shown in FIG. 2. To attain the required power and energy data with the battery system, in a battery individual battery cells 1a are connected in series and in part additionally in parallel. Between the battery cells 1a and the poles of the battery system is a so-called safety and fuse unit 11, which for instance connects the battery 1 into external systems and undoes that connection, protects the battery system against impermissibly high currents and voltages, and also performs such safety functions as the single-pole disconnection of the battery cells 1a from the battery system poles if the battery system housing is opened. A further function unit is formed by the battery management 12, which besides the battery state identification 12a also performs the communication with other systems as well as the thermal management of the battery 1.

The function unit for battery state identification 12a shown in FIG. 2 has the task of determining the actual state of the battery 1 and of predicting the future performance of the battery 1, for instance predicting its life and/or range. Predicting the future performance is also called forecasting. The basic layout of a model-based battery state identification is shown in FIG. 3. The model-based battery state identification and prediction shown is based for instance on evaluating the electrical variables of the battery current, the battery voltage, and the temperature of the battery. The battery state identification can be done for individual cells 1a of a battery 1. This is then done on the basis of the corresponding cell voltage, cell current, and cell temperature. The battery state identification can also be done for the entire battery 1. This is then done—depending on the requirements for precision—either by evaluating the states of the individual cells 1a of the battery 1 and an aggregation based thereon for the entire battery 1, or directly by evaluating the total battery voltage, battery current, and battery temperature. One of the essential items of information that describe the aging state of the battery cells 1a is the reduction in capacity of the cells 1a over the life. All the present methods for ascertaining the capacity of the cells 1a share the feature that the courses of current, voltage and temperature that occur in normal operation of the battery 1 are used for ascertaining the capacity. To that end, in normal operation of the cells, changes in the charge state of at least 20% must occur, in order to attain satisfactory precision in ascertaining the capacity. Moreover, the charge that can be withdrawn in total from the battery cells 1a is very strongly dependent on the magnitude of the discharging current. Precise determination of the capacity of the battery cells 1a, which relates to standard discharge conditions at room temperature and a discharging current, for instance of 1C (discharging current in A corresponds to rated capacity of the battery in Ah) during normal operation of the battery 1 is therefore quite difficult, since arbitrary current courses can occur, with different high discharging currents and with charging phases occurring in between.

In FIG. 4, the functional principle of an arrangement for so-called resistive balancing of battery cells is shown. The object of cell balancing is, in a series circuit of a plurality of individual cells 1a, to ensure that the cells 1a all have nearly the same charge state or nearly the same cell voltage. Because of the fundamentally existing asymmetries of the battery cells 1a, such as slightly different capacitance or slightly different self-discharging, ensuring that they have virtually the same charge state or cell voltage could not be done during operation of the battery 1 unless additional provisions are made. In resistive cell balancing, the battery cells 1a can be discharged by way of connecting in an ohmic resistor $R_{Bal\_n}$, disposed parallel to the cell, by connecting the resistor $R_{Bal\_n}$ in parallel to the cell n via the transistor $T_{Bal\_n}$. By discharging those cells 1a that have a higher charge state or a higher voltage than the cell or cells 1a with the least charge state or the least voltage, the charge states or voltages can be made symmetrical throughout all the cells 1a of the battery 1. Triggering the transistor $T_{Bal\_n}$ is done via an associated control and evaluation unit $S_n$, which taps the cell voltage via a filter $F_n$ and an analog/digital converter $AD_n$. In lithium-ion batteries, which comprise a series circuit of a plurality of individual cells, the state of the art is to use resistive cell balancing. There are still other methods for cell balancing that can operate virtually without loss, such as so-called inductive cell balancing, in which reloading energy stored in individual cells 1a is done via an inductive resistor, for instance. A basic illustration of inductive cell balancing is shown in FIG. 5.

The model-based battery state identification and prediction presented above is based on evaluating the electrical variables of battery current and voltage as well as the temperature of the battery. All the methods in the prior art have in common the fact that the courses of battery current, voltage and temperature in normal operation of the battery are used for ascertaining the battery state and for predicting future performance. In vehicles, the battery state identification operates automatically.

OBJECT AND SUMMARY OF THE INVENTION

It is the object of the present invention to present a novel concept for performing the battery state identification (battery diagnosis), with which the battery state identification and prediction can be implemented more robustly and precisely than in the prior art.

The method and the apparatus according to the invention have the advantage by comparison that not only the courses of operation that occur in normal operation in the vehicle are or can be used for diagnosing the properties of the battery, but diagnosis is also not done during normal operation or primary mode of operation but rather with the vehicle parked. Thus according to the invention, for diagnosing the properties of the battery, greater changes in current and/or charge state can be carried out in order to perform the diagnosis.

Especially preferably, the method and apparatus according to the invention include the fact that the consumer in the primary mode of operation is supplied by the battery and is on, or in other words is not off and is not in the standby mode, and particularly when a vehicle is the consumer, ascertaining the properties of the battery is begun only once the vehicle is parked.

The method according to the invention alternatively or additionally preferably includes the fact that the ascertainment of the properties of the battery is started only whenever a user of the consumer initiates the ascertainment of the properties of the battery. The corresponding preferred refinement of the apparatus of the invention for that purpose includes a user interface, which communicates with the first control module; by way of this interface, a user can initiate the process of ascertaining the properties of the battery, and the interface] carries a corresponding control signal to the first control module.

The method according to the invention moreover alternatively or additionally preferably includes the fact that ascertaining the properties of the battery is begun only once a performance prediction, via the user of the consumer, indicates, with a probability that is above a determined limit value, that the consumer will not be put into the primary mode of operation within a predetermined ensuing period of time. The corresponding preferred refinement of the apparatus of the invention for that purpose includes a probability module, which communicates with the first control module and performs a performance prediction, via the user of the consumer, as to whether, with a probability above a determined limit value, the consumer will not be put into the primary mode of operation within a predetermined ensuing period of time, this module carries a corresponding control signal to the first control module.

According to the invention, the diagnosis of the battery is thus preferably performed, tripped by the driver, when the vehicle is parked. This concept is based on the fact that the driver can start the diagnosis of the battery intentionally by way of the man-machine interface of the vehicle if he intends to park the vehicle for a defined minimum parking time—for instance, at least two hours. On the assumption that the vehicle will not be started again until after that minimum parking time, an expanded diagnosis of the battery, compared with the present state of the art, can be performed in which essential parameters for the battery state identification and prediction can be ascertained reliably with high precision. This represents a substantial improvement in comparison to previous systems.

The method of the invention moreover alternatively or additionally preferably includes the fact that for ascertaining the capacity of the battery, the following steps are performed: switching at least one cell of the battery to a first defined charge state; discharging or charging the at least one cell of the battery from the first defined charge state to a second defined charge state, and during the discharging or charging, a charge withdrawn from or supplied to the at least one cell is determined; and ascertaining the capacity of the battery on the basis of the determined withdrawn or supplied charge of the at least one cell. The corresponding preferred refinement of the apparatus of the invention for that purpose includes a second control module for switching at least one cell of the battery to a first defined charge state and for discharging or charging the at least one cell of the battery from the first defined charge state to a second defined charge state; a charge measurement module, for determining a charge withdrawn from or supplied to the cell; and a capacity-determining module for ascertaining the capacity of the battery on the basis of the determined withdrawn or supplied charge of the at least one cell.

In this case, the method and apparatus of the invention especially preferably include the fact that the charge withdrawn from or supplied to the at least one cell during the discharging or charging is determined on the basis of the discharging current or charging current and/or of a voltage applied to the at least one cell during the discharging or charging and/or of the change in the idle-state voltage of the at least one cell.

In the above ascertainment of the capacity of the battery, the method and apparatus of the invention especially preferably include the fact that the first defined state is a fully charged state, and the second defined state is a completely discharged state, or that the first defined state is an arbitrary state of the cell that has a charge at least 20% higher or lower than the second defined state.

In the above ascertainment of the capacity of the battery, the method and apparatus of the invention alternatively or additionally especially preferably include the fact that the capacity is determined taking parameters of the discharging or charging operation into account, in particular taking into account the discharging current or charging current and/or the ambient temperature during the discharging; and/or that the determined capacity of the battery is recalculated to a standard discharge. In the corresponding preferred refinement of the apparatus of the invention, this is done by means of the capacity-determining module.

In the above ascertainment of the capacity of the battery, the method and apparatus of the invention alternatively or additionally especially preferably include the fact that the capacity of the battery system is ascertained on the basis of the ascertained withdrawn or supplied charge of all the cells, and this can be done over a plurality of instances of starting the ascertaining the properties of the battery; or that the capacity of the battery system is ascertained on the basis of the ascertained withdrawn or supplied charge of a number of cells that is less than all the cells of the battery, and preferably of these cells, it is known on the basis of at least one battery state identification performed beforehand that the battery has a maximum and/or a minimum and/or an average capacity. In the corresponding preferred refinement of the apparatus of the invention, this is done by means of the second control module.

In the above ascertainment of the capacity of the battery, the method and apparatus of the invention alternatively or additionally especially preferably include the fact that switching at least one cell of the battery to a first defined charge state and discharging or charging the at least one cell are effected by means of a circuit for cell balancing, in particular by means of an inductive method. In the corresponding preferred refinement of the apparatus of the invention, triggering of the circuit for the cell balancing is done by the second control module. Also preferably, the charge measurement module is integrated with the circuit for the cell balancing.

According to the invention, a method is accordingly described for ascertaining the capacity of battery cells which can be used in battery systems with the use of inductive cell balancing, without additional electronic circuitry expense or complexity. Compared to the present state of the art, this method has the advantage that for ascertaining the capacity, the same operating sequence can be brought about again and again, and as a result, especially robust, precise determination becomes possible. Moreover, the novel method has the advantage that it is used in phases of operation in which the battery is not involved in supplying a consumer, and thus in this respect is not outputting or picking up any power at its terminals, or in other words with the vehicle parked. This is not possible in the currently known methods for capacity determination.

BRIEF DESCRIPTION OF THE DRAWINGS

One exemplary embodiment of the invention will be described in detail below in conjunction with the accompanying drawings. In the drawings.

DESCRIPTION OF THE PREFERRED EMBODIMENT

Below, preferred embodiments of the invention will be described in detail in conjunction with the drawings.

The fundamental concept of the present invention is to perform the diagnosis of determined battery properties during relatively long parked phases. For that purpose, the driver can be asked, for instance via the man-machine interface (MMI) of the vehicle, to trip such a battery diagnosis if he will definitely adhere to a defined minimum parking time. On the assumption that this minimum parking duration will be adhered to, a markedly expanded and more-precise diagnosis of determined battery properties can be performed, compared to the present state of the art, without subsequently impairing the functionality of the battery system while adhering to the minimum parking time. For instance, test procedures that take a relatively long time can be performed for determining the actual capacity of the battery or of individual battery cells. Depending on how the diagnosis is done, if the minimum parking time is not adhered to, there may be a brief restriction in the functionality of the battery system; this can be expressed for instance in a reduced range of the immediately ensuing trip in an electric vehicle.

Figure 1:
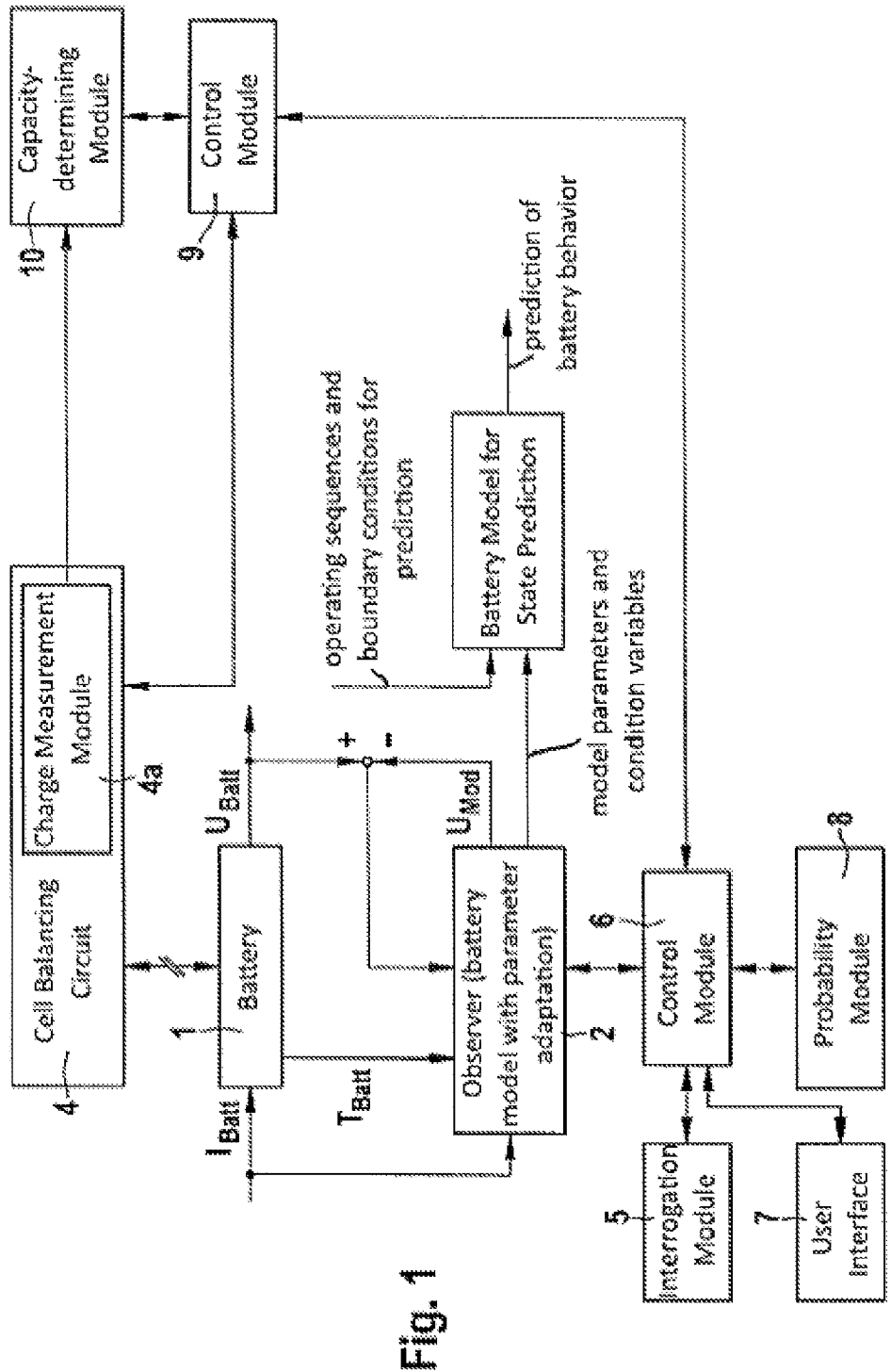
FIG. 1 shows a basic circuit diagram of an exemplary preferred embodiment of an apparatus according to the invention for ascertaining properties of a battery.
Figure 2:
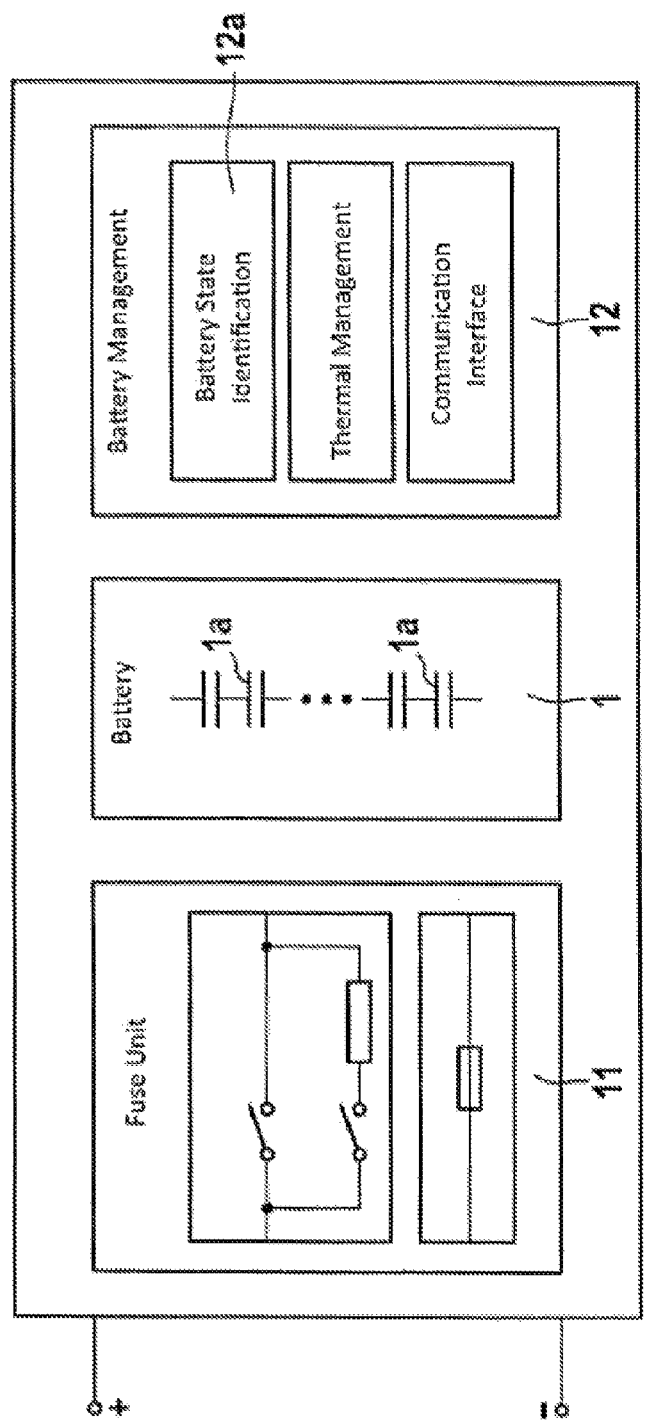
FIG. 2 shows a functional layout of a battery system according to the prior art.
Figure 3:
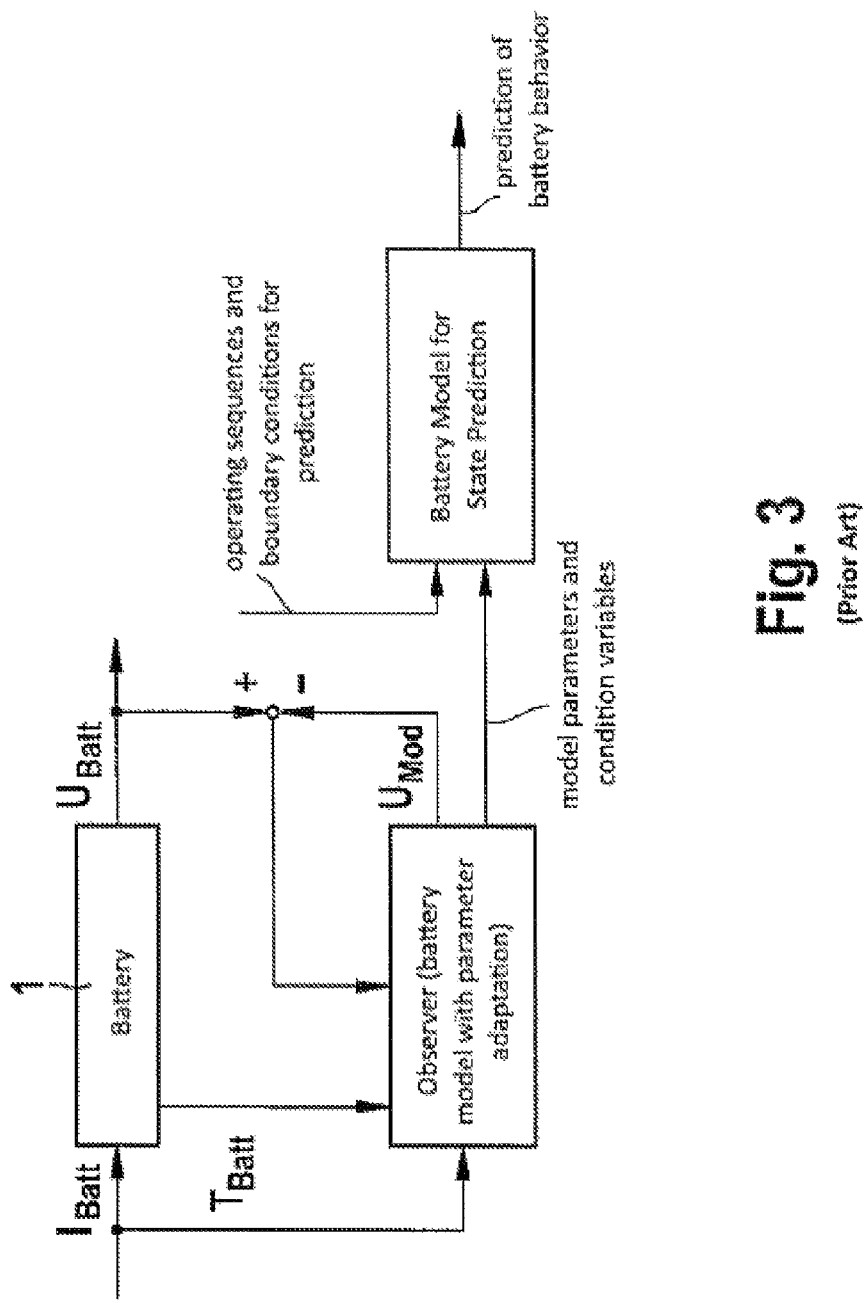
FIG. 3 is a basic circuit diagram of a model-based battery state identification and prediction in the prior art.
Figure 4:
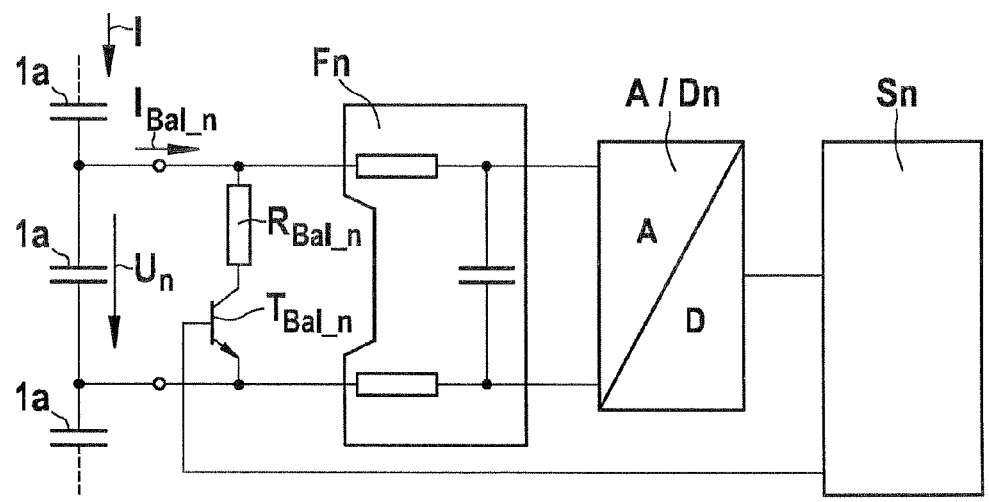
FIG. 4 is a basic circuit diagram of an arrangement for resistive cell balancing of the battery cells in the prior art.

For that purpose, according to the invention, a first control module 6 is provided, which initiates the battery diagnosis, for instance via the observer 2, with a battery model. The control module 6, as is shown in FIG. 1, is connected to an interrogation module 5, which tells the first control module 6 which operating state the consumer, in this case the vehicle, is in; that is, for instance whether it is in a primary mode of operation or in other words is being driven, which can include being briefly stopped, or is parked. Moreover, the first control module 6 is connected to a user interface 7, which is for instance integrated with the aforementioned man-machine interface, by way of which the user of the consumer, in this case the driver of the vehicle, can start the ascertainment of the properties of the battery. According to the invention, this naturally takes place only whenever at the applicable time the operating state of the consumer, ascertained by the interrogation module 5, indicates that the consumer is not operating in a primary mode of operation. The first control module 6 is furthermore connected to a probability module 8, which preferably permits the ascertaining the properties of the battery only whenever a performance prediction affected by this module indicates by way of the user of the consumer that, with a probability that is above a determined limit value, the consumer will not be put into the primary mode of operation within a predetermined ensuing period of time. In the case of vehicles, for instance, this can be the case when they are parked overnight in a garage.

Figure 5:
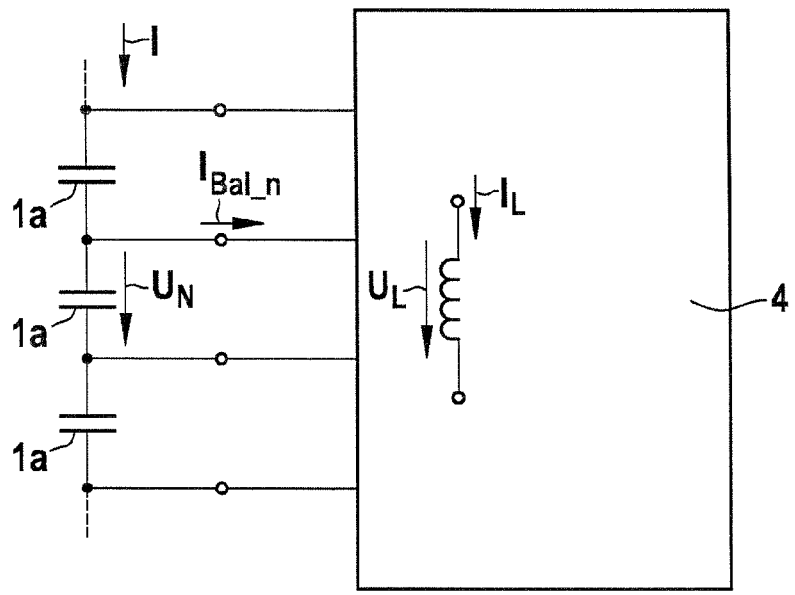
FIG. 5 is a basic circuit diagram of inductive balancing of the battery cells in the prior art.

In FIG. 5, the basic principle for so-called inductive cell balancing is illustrated. The term inductive cell balancing is used when the circuitry concept for adapting the cell voltages or the charge state of the cells is based on an inductive buffer storage of the electrical energy transported in the process. The buffer storage—depending on the circuitry concept—can be done in throttles or transformers.

In inductive cell balancing, in a first step, energy is withdrawn from one or more cells and buffer-stored in the inductive reservoir. In a second step, the buffer-stored energy is re-stored into one or more battery cells. As examples, the following can be named:

energy withdrawal from one cell and re-storage into one or more cells, but re-storage is not done into the cell from which energy was withdrawn;

energy withdrawal from one cell and re-storage into one or more cells, with some of the energy being re-stored into the cell from which energy was withdrawn;

energy withdrawal from a plurality of cells and re-storage into one or more cells, but re-storage is not done into the cells from which energy was withdrawn;

energy withdrawal from a plurality of cells and re-storage into one or more cells, with some of the energy being re-stored into the cells from which energy was withdrawn.

The charge that was withdrawn in the first step from the cells or cells can be calculated as follows over the voltage time area for a known inductance of the reservoir used for buffer-storage of the energy:

The course over time of the current in the inductive component becomes $$I_L = \frac{1}{L} \int U_L dt \tag{1}$$

Let the maximum current at the end of the first step be $I_{Lmax}$.

The charge withdrawn in the first step can be calculated as follows:

$$Q_{ent} = \int I_L dt \tag{2}$$

The voltage $U_L$ at the inductive component—on the assumption of ideal electronic switches with a pass resistance near 0 and an ideal inductive component that has no ohmic internal resistance—can be ascertained simply from the voltage or voltages of those cells from which the energy is withdrawn. Thus by way of equations (1) and (2), the charge withdrawn from the cells can be determined. The non-ideal properties of the electronic switches used for the cell balancing and of the inductive components, given suitable dimensioning of the components, cause only slight errors in ascertaining the charge that is withdrawn from the cell or cells.

In an equivalent form, in the second step the feeding back of the buffer-stored energy into the cell or cells can be calculated as follows:

The course over time of the current in the inductive component becomes $$I_L = I_{Lmax} + \frac{1}{L}\int U_L dt, \text{ in which } U_L < 0 \quad (3a)$$

Once the current $I_L$ has assumed the value of 0, the following applies:

$$I_L = 0 \quad (3b)$$

The charge that is fed back in the second step can be calculated as follows:

$$Q_{zu} = \int I_L dt \quad (4)$$

Thus the charge transport that occurs in carrying out the cell balancing between the battery cells can be determined.

According to the invention, the circuit for performing the inductive cell balancing is preferably used to ascertain the capacity of the battery cells. The determination of the capacity is done in phases in which the battery is not outputting or taking up any power at its terminals.

For ascertaining the capacity of a battery cell 1a, the cell 1a can first, beginning at the charge state that it has upon parking of the vehicle, be fully charged. To that end, this cell 1a is supplied, with the aid of the circuit 4 for the inductive cell balancing, with a charge that is withdrawn from other battery cells 1a. Because of the high efficiency that the circuit 4 for inductive cell balancing has, given suitable dimensioning, only a slight portion of the transported energy is converted into heat in the process. Based on the fully-charged state, the cell 1a is then discharged to a defined charge state (for instance, to the charge state of 0%). The charge withdrawn in the process can be ascertained by the described method. The withdrawn energy is stored in other cells 1a. The cell 1a is then recharged, and cell balancing is performed for making the cell voltages or the charge states symmetrical. In this way, the capacity of a battery cell 1a can be ascertained very precisely. The magnitude of the discharge current has an influence on the charge that can be withdrawn in all from the battery cell 1a during the discharging. The ascertained capacity is thus related to the parameters of the discharging operation (such as discharging current and temperature). A major advantage of the method presented here is that again and again, the same discharging currents can be used for ascertaining the capacity, and the normal mode of operation (the primary mode of operation), with its current courses that are unaffected by the battery system, has no adverse influence.

The capacity of the battery cell ascertained by the method of the invention can be recalculated to a so-called standard discharge (done for instance at room temperature with a discharge current 1C (discharge current corresponds to the rated capacitance of the cell; for a cell with a capacitance of 4 Ah, the 1C current is 4 A)).

Figure 6:
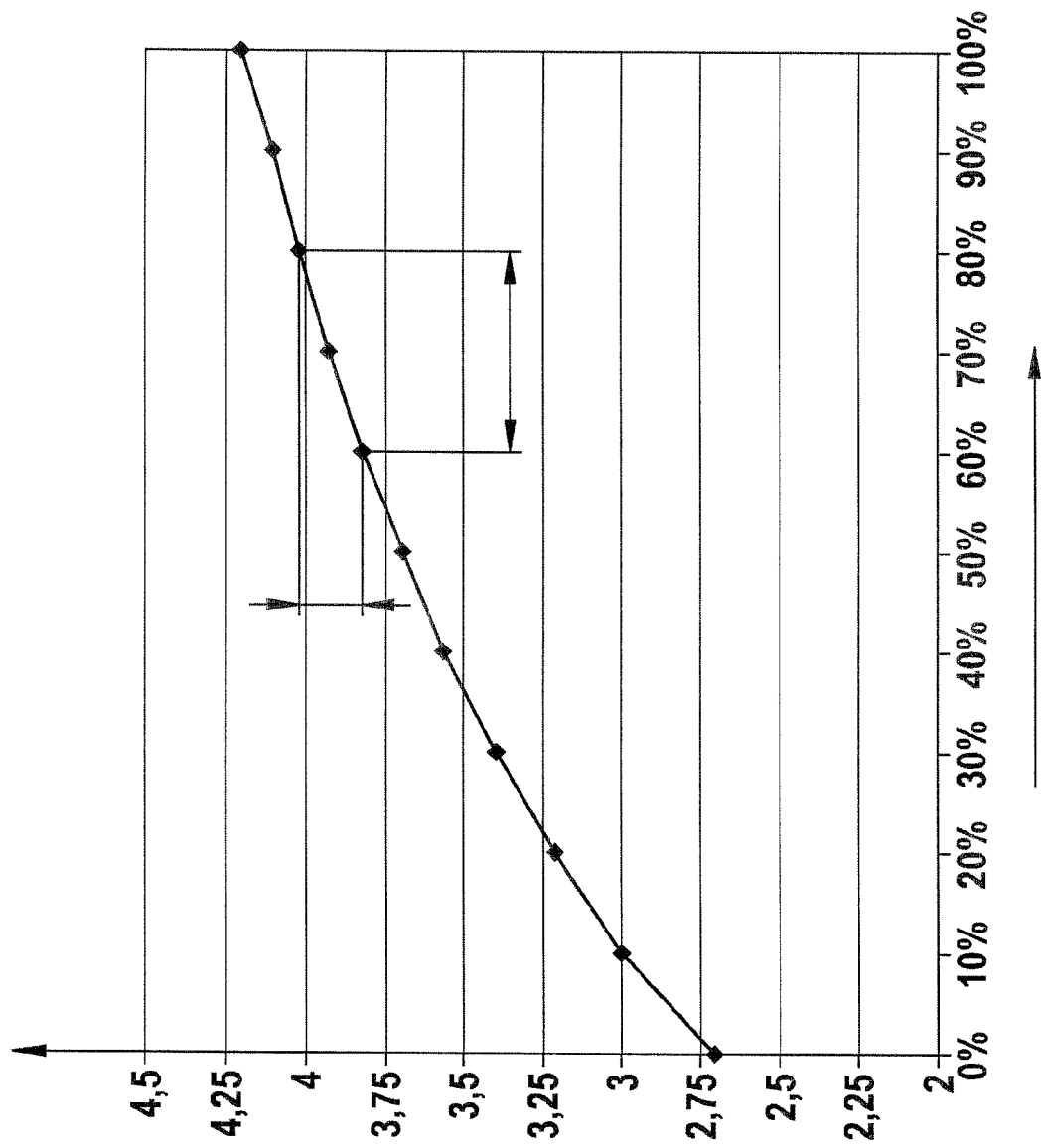
FIG. 6 is a graph of the idle-state voltage of a battery cell over its charge state.

In a modified form of the preferred method of the invention, the cell 1a is not put into the fully charged state and subsequently fully discharged; instead, only a determined voltage range of the cell (referred to the so-called open circuit voltage or OCV of the cell (idling voltage)) is traversed in the discharging process, and the charge withdrawn is evaluated. The charge state of the cell should vary by at least the order of magnitude of 20%, so that a sufficiently precise determination of the capacity becomes possible. A graph which shows the idling voltage of a cell plotted over its charge state is shown in FIG. 6. It can be learned here that a change in idling voltage or idle-state voltage of $\approx 0.2$ V between approximately 3.85 V and 4.05 V corresponds in the ideal case to a withdrawn or supplied charge of 12 Ah, which in turn, for a 60-Ah cell, corresponds to a change in charge of 20%. From the deviation of the actual withdrawn or supplied charge to the charge in accordance with the ideal case (=new cell), a conclusion can for instance be drawn about the remaining life.

The capacity of all the individual cells 1a, in a battery 1 having a great number of series-connected battery cells 1a, may possibly not be ascertained completely during a parked phase but instead must extend over a plurality of parked phases. For the method described, however, this is no limitation. Often, it is entirely adequate for the capacity of a few cells 1a, such as the values of those cells of which it can be assumed, based on performing the battery state identification in the normal mode of operation, that they have the maximum or the minimum or an average capacity, to be subjected to the method described, in order to ascertain their capacity with high precision.

The reduction in capacity of the battery cells 1a over the life is one of the essential aging parameters of the battery cells 1a. Precise knowledge of the actual capacity of the cells 1a is of essential significance for the battery state identification and prediction. In the previously known methods, the capacity of the battery cells 1a can be ascertained only in phases of operation in which the charge state of the cells varies significantly (for instance by at least 30%) during "normal operation" (or the primary mode of operation), and in which during that change in charge state no extremely high discharging currents occur. Ascertaining the capacity of the battery cells by the described method can therefore be done substantially more robustly and precisely, compared to the prior art.

For this ascertaining of the capacity of the battery cells, which is preferably done according to the invention, a second control module 9 is provided, which suitably triggers the circuit 4 for the cell balancing, which includes the charge measurement module 4a, as well as a capacity-determining module 10, which is connected to the charge measurement module 4a. The second control module 9 is connected to the first control module 6 so that the latter can initiate the start of each battery diagnosis.

Besides the above written disclosure, the disclosure in the drawings is expressly referred to here.

The foregoing relates to the preferred exemplary embodiment of the invention, it being understood that other variants and embodiments thereof are possible within the spirit and scope of the invention, the latter being defined by the appended claims.

The invention claimed is:

1. A method for ascertaining properties of a battery, such as a capacity and/or a charge state and/or a remaining life of the battery, by means of a model-based state identification, comprising the steps of:
   interrogating an operating state of a consumer supplied by the battery;
   performing a process for ascertaining the properties of the battery based at least in part on the operating state of the consumer indicated by the interrogation, the properties including at least a capacity of the battery; and
   starting the process for ascertaining an ascertainment of the properties of the battery only whenever the operating state of the consumer being supplied indicates that the consumer is not operating in a primary mode of operation,
   wherein for ascertaining the capacity of the battery, the following steps are performed:
   switching at least one cell of the battery to a first defined charge state;

discharging or charging the at least one cell of the battery from the first defined charge state to a second defined charge state, and during the discharging or charging, a charge withdrawn from or supplied to the at least one cell is determined; and ascertaining the capacity of the battery based on the determined charge withdrawn from or supplied to the at least one cell.

2. The method as defined by claim 1, wherein the consumer in the primary mode of operation is supplied by the battery and is on, and is not in a standby mode, and when a vehicle is the consumer, ascertaining the properties of the battery is begun only once the vehicle is parked.

3. The method as defined by claim 1, wherein the ascertainment of the properties of the battery is started only whenever an operator of the consumer initiates the ascertainment of the properties of the battery.

4. The method as defined by claim 1, wherein the ascertainment of the properties of the battery is started only whenever a performance prediction via an operator of the consumer indicates that, with a probability that is above a determined limit value, the consumer will not be put into the primary mode of operation within a predetermined ensuing period of time.

5. The method as defined by claim 1, wherein the charge withdrawn from or supplied to the at least one cell during the discharging or charging is determined based on a discharging current or charging current and/or of a voltage applied to the at least one cell during the discharging or charging and/or of a change in idle-state voltage of the at least one cell.

6. The method as defined by claim 1, wherein:
the first defined state is a fully charged state, and the second defined state is a completely discharged state; or
the first defined state is an arbitrary state of the cell that has a charge at least 20% higher or lower than the second defined state.

7. The method as defined by claim 1, wherein:
the capacity is determined, taking parameters of the discharging or charging operation into account of discharging current or charging current and/or ambient temperature during the discharging or charging; and/or
the determined capacity of the battery is recalculated to a standard discharge.

8. The method as defined by claim 1, wherein:
the capacity of the battery is ascertained based on an ascertained charge of all the cells over a plurality of instances of starting the ascertainment of the properties of the battery; or
the capacity of the battery is ascertained based on an ascertained charge of a number of cells that is less than all the cells of the battery, and of these cells, it is known based on at least one battery state identification performed beforehand that the battery has a maximum and/or a minimum and/or an average capacity.

9. The method as defined by claim 1, wherein switching at least one cell of the battery to a first defined charge state and discharging or charging the at least one cell are effected via a circuit for cell balancing, by means of an inductive method.

10. An apparatus for ascertaining properties of a battery, such as a capacity and/or a charge state and/or a remaining life of the battery, with an observer and a battery model for a model-based state identification, comprising:
an interrogation module for interrogating an operating state of a consumer being supplied by the battery;
a first control module for indicating when to start a process for ascertaining the properties of the battery, the first control module being configured to indicate that the process for ascertaining the properties is to be started only whenever the operating state of the consumer being supplied by the battery indicates that the consumer is not operating in a primary mode of operation; and
a second control module for switching at least one cell of the battery to a first defined charge state and for discharging or charging the at least one cell of the battery from the first defined charge state to a second defined charge state when the first control module indicates when to start the process for ascertaining the properties of the battery;
a charge measurement module for determining a charge withdrawn from or supplied to the cell; and
a capacity-determining module for ascertaining the capacity of the battery based on a determined charge withdrawn from or supplied to the at least one cell.

11. The apparatus as defined by claim 10, wherein the consumer in the primary mode of operation is supplied by the battery and is on, and is not in a standby mode, and when a vehicle is the consumer, ascertainment of the properties of the battery is begun only once the vehicle is parked.

12. The apparatus as defined by claim 10, further comprising a user interface, which communicates with the first control module and by way of which an operator can initiate the ascertainment of the properties of the battery, and which user interface carries a corresponding control signal to the first control module.

13. The apparatus as defined by claim 10, further comprising a probability module, which communicates with the first control module and performs a performance prediction, via an operator of the consumer, as to whether, with a probability above a defined limit value, the consumer will not be put into the primary mode of operation within a predetermined ensuing period of time, and which probability module carries a corresponding control signal to the first control module.

14. The apparatus as defined by claim 10, wherein the charge measurement module determines the charge withdrawn from or supplied to the at least one cell during the discharging or charging, based on a discharging current or charging current and/or based on a voltage applied to the at least one cell during the discharging or charging and/or of a change in idle-state voltage of the at least one cell.

15. The apparatus as defined by claim 10, wherein:
the first defined state is a fully charged state, and the second defined state is a completely discharged state; or
the first defined state is an arbitrary state of the cell that has a charge at least 20% higher or lower than the second defined state.

16. The apparatus as defined by claim 10, wherein:
the capacity-determining module determines the capacity, taking parameters of the discharging or charging operation into account, of discharging current or charging current and/or ambient temperature during the discharging or charging; and/or
the capacity-determining module recalculates a determined capacity of the battery to a standard discharge.

17. The apparatus as defined by claim 10, wherein:
the second control module puts all the cells of the battery in a first defined charge state and discharges or charges to a second defined charge state, so that the capacity of the battery is ascertained based on the ascertained charge of all the cells over a plurality of instances controlled by the first control module of the starting of the ascertainment of the properties of the battery; or
a number of cells that is less than all the cells of the battery, of which cells it is known, based on at least one battery state identification performed beforehand, that the battery has a maximum and/or a minimum and/or an average capacity, are put in a first defined charge state and discharged to a second defined charge state, so that the capacity of the battery is ascertained based on the less number of cells.

18. The apparatus as defined by claim 10, wherein the second control module triggers a circuit for cell balancing, in order to put the at least one cell of the battery in a first defined charge state and discharge it to a second defined charge state.

19. The apparatus as defined by claim 18, wherein the charge measurement module is integrated with the circuit for cell balancing.

\* \* \* \* \*

UNITED STATES PATENT AND TRADEMARK OFFICE
CERTIFICATE OF CORRECTION

PATENT NO.        : 8,886,478 B2                                          Page 1 of 1
APPLICATION NO.   : 13/264923
DATED             : November 11, 2014
INVENTOR(S)       : Holger Fink It is certified that error appears in the above-identified patent and that said Letters Patent is hereby corrected as shown below:

In the Claims,

In claim 1, column 8, line 59, replace the text beginning with "starting the process for" to and ending "in a primary mode of operation," in claim 1, column 8, line 63, with --starting the process for ascertaining the properties of the battery only whenever the operating state of the consumer being supplied indicates that the consumer is not operating in a primary mode of operation,--

Signed and Sealed this
Thirtieth Day of June, 2015

Michelle K. Lee
*Director of the United States Patent and Trademark Office*